United States Patent
Palla et al.

(10) Patent No.: US 12,248,463 B1
(45) Date of Patent: Mar. 11, 2025

(54) QUERY ENHANCEMENTS FOR CONTEXTUAL DATA AGGREGATOR

(71) Applicant: Amazon Technologies, Inc., Seattle, WA (US)

(72) Inventors: Srinivas Palla, Redmond, WA (US); Manoj Mandam, Jersey City, NJ (US); Maitri Prraveg Shroff, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 147 days.

(21) Appl. No.: 17/393,139

(22) Filed: Aug. 3, 2021

(51) Int. Cl.
| | | |
|---|---|---|
| G06F 16/00 | (2019.01) | |
| G06F 16/242 | (2019.01) | |
| G06F 16/2453 | (2019.01) | |
| G06F 16/248 | (2019.01) | |
| G10L 15/22 | (2006.01) | |
| G10L 15/30 | (2013.01) | |

(52) U.S. Cl.
CPC .......... *G06F 16/244* (2019.01); *G06F 16/243* (2019.01); *G06F 16/24532* (2019.01); *G06F 16/248* (2019.01); *G10L 15/22* (2013.01); *G10L 15/30* (2013.01)

(58) Field of Classification Search
CPC .............. G06F 16/243; G06F 16/244; G06F 16/24532; G06F 16/248; G10L 15/22; G10L 15/30
USPC ................................................. 707/600–899
See application file for complete search history.

(56) References Cited

U.S. PATENT DOCUMENTS

| | | | |
|---|---|---|---|
| 9,804,886 B1* | 10/2017 | Wells | G06F 9/5033 |
| 10,585,720 B1* | 3/2020 | Kesler | G06F 16/211 |
| 11,615,143 B2* | 3/2023 | Zhuang | G06F 16/9024 |
| | | | 707/718 |
| 2020/0117737 A1* | 4/2020 | Gopalakrishnan | |
| | | | G06F 16/9535 |
| 2021/0103586 A1* | 4/2021 | Quamar | G06N 20/00 |
| 2021/0157850 A1* | 5/2021 | Tong | G06F 16/245 |
| 2021/0248143 A1* | 8/2021 | Khillar | G06F 16/2379 |
| 2022/0050840 A1* | 2/2022 | Parravicini | G06N 5/025 |
| 2022/0292067 A1* | 9/2022 | Zhang | G06F 16/2282 |
| 2022/0414092 A1* | 12/2022 | Carter | G06F 16/2453 |
| 2022/0414100 A1* | 12/2022 | Carter | G06F 16/2471 |

\* cited by examiner

*Primary Examiner* — Michelle N Owyang
(74) *Attorney, Agent, or Firm* — K&L Gates LLP

(57) ABSTRACT

Devices and techniques are generally described for query enhancements for a contextual data aggregator. In some examples, a context aggregator component may receive from a first computing device, a first query directed to a graph database. In some examples, the first query may include a first sub-query and a second sub-query. In some cases, the context aggregator component may determine that a first input to the first sub-query includes first output data from the second sub-query. In various examples, the first output data may be determined from the second sub-query. In further examples, the first output data may be provided from the second sub-query as the first input to the first sub-query to generate first result data. In various examples, the first result data may be sent to the first computing device.

20 Claims, 12 Drawing Sheets

Context Aggregator Component 138

```
query A ($firstId: String!, $secondId: String!) {
    alias1: testType (id: $firstId) {
        id
    }
    alias2: testType (id: $secondId) {
        id
    }
}
query B ($thirdId: String!) {
    testType (id: $thirdId) {
        id
    }
}
query C ($fourthId: String!){
    testType (id: $fourthId) {
        id
    }
}
```

FIG. 3A

Context Aggregator Component 138

```
// GraphQL Variables
{
  "thirdId" : <value for variable thirdId>
  "fourthId" : <value for variable fourthId>
}

// Dependent Variables
{
  "firstId": "$.B.testType.id",
  "secondId" : "$.C.testType.id"
}
```

FIG. 3B

Context Aggregator Component 138

```
extend type Query {
    evaluateToBoolean(condition: String!,
        intArg1: Int,
        intArg2: Int,
        intArg3: Int,
        stringArg1: String,
        stringArg2: String,
        stringArg3: String,
        boolArg1: Boolean,
        boolArg2: Boolean,
        boolArg3: Boolean): Boolean)

evaluateToInteger(condition: String!,
        intArg1: Int,
        intArg2: Int,
        intArg3: Int,
        stringArg1: String,
        stringArg2: String,
        stringArg3: String,
        boolArg1: Boolean,
        boolArg2: Boolean,
        boolArg3: Boolean): Int)

evaluateToString(condition: String!,
        intArg1: Int,
        intArg2: Int,
        intArg3: Int,
        stringArg1: String,
        stringArg2: String,
        stringArg3: String,
        boolArg1: Boolean,
        boolArg2: Boolean,
        boolArg3: Boolean): String)
```

FIG. 7A

```
Context Aggregator Component 138 query CORQuery ($accountId: ID!) {
    account(id: $accountId) {
        settings {
            countryOfResidence(accountPool: "Amazon")
        }
    }
} query CustomerAgeQuery ($accountId: ID!) {
    account(id: $accountId) {
            customerFirstName
        customerAge
    }
} query EvaluateQuery($condition: String!, $cor: String, $customerAge: Int) {
        evaluateToBoolean(condition: $condition, stringArg1: $cor, intArg1: $customerAge)
} query TVCableQuery ($accountId: ID!, $evaluate: Boolean) {
    account(id: $accountId) {
        settings {
            tvCableProvider @include(if: $evaluate)
        }
    }
}

=== Variables ===
"accountId" = " B7ISMR41G11 "
"condition" = "<#if stringArg1?? && intArg1 gt 18>True<#else>False</#if>"

=== Dependent Variables ===
"cor" = "${CORQuery.account.settings.countryOfResidence}"
"customerAge" = "${CustomerAgeQuery.account.customerAge}"
"evaluate" = "${EvaluateQuery.evaluateToBoolean}"
```

FIG. 7B

QUERY ENHANCEMENTS FOR CONTEXTUAL DATA AGGREGATOR

BACKGROUND

Automatic speech recognition (ASR) combined with language processing techniques may enable a computing device to retrieve and process commands based on a user's spoken commands. In some systems, speech recognition and/or voice-controlled devices activate upon detection of a spoken "wake-word" or "wake command". Natural language processing is used to translate the spoken commands into computer-executable instructions. The executable instructions are executed and a corresponding task is performed. Such speech recognition and voice control may be used by personal computers, hand-held devices, telephone computer systems, and a wide variety of other computing devices to improve human-computer interactions.

BRIEF DESCRIPTION OF DRAWINGS

FIGS. 3A and 3B depict an example of source code that may be used to implement dependent queries, in accordance with various embodiments described herein.

FIGS. 7A and 7B depict an example of source code that may be used to implement conditional compound queries, in accordance with various embodiments described herein.

DETAILED DESCRIPTION

Figure 1:
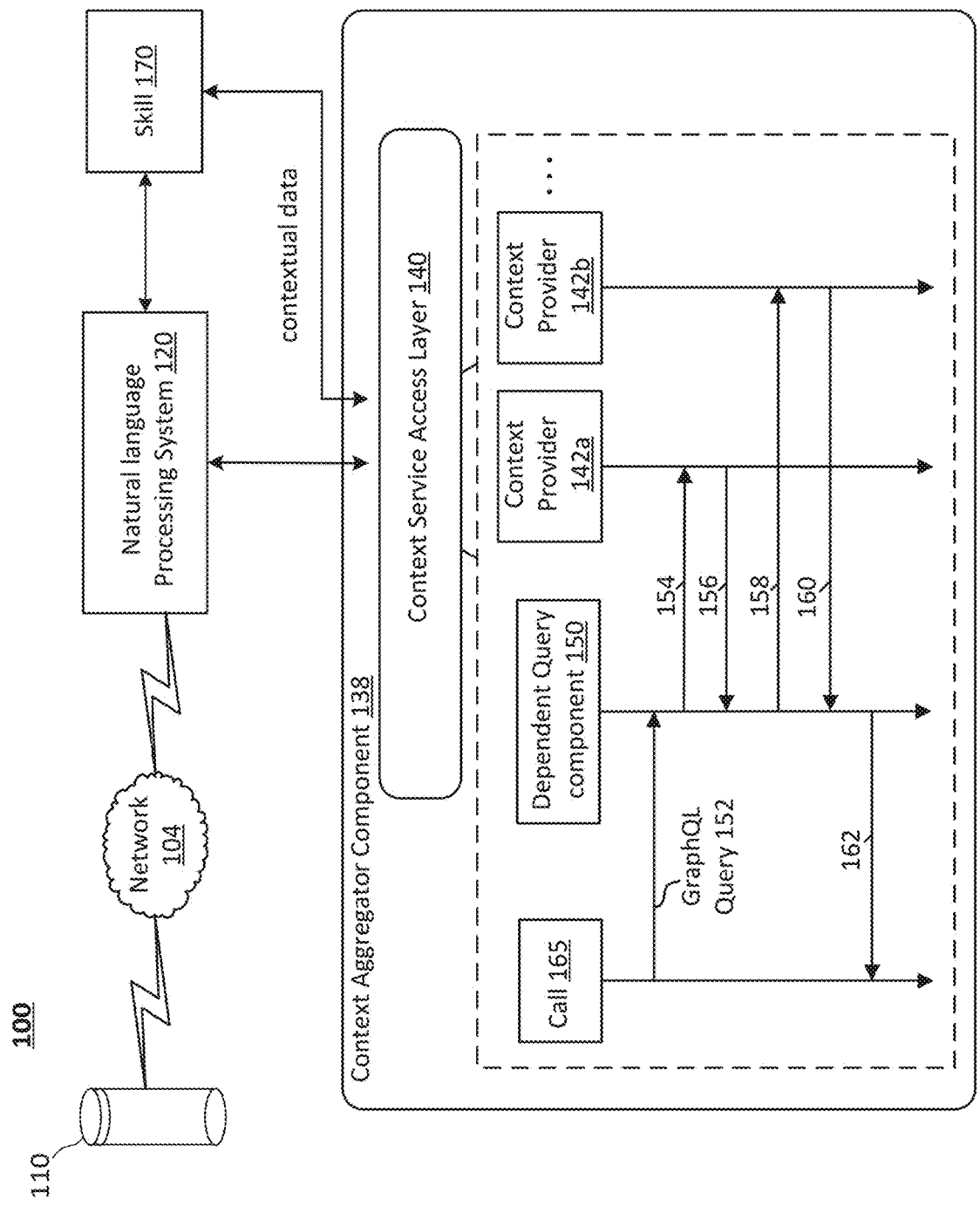
FIG. 1 is a conceptual illustration of a system including a context aggregator component that is effective to process dependent queries, in accordance with various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates commands that may be executed by one or more other computing devices and/or speech processing components. In various examples, spoken language understanding may be a combination of ASR systems and NLU systems, while in other examples, spoken language understanding may be a single model effective to perform the functions of both ASR and NLU. In various further examples, SLU may include TTS where a machine learning model may receive input audio data (e.g., a user utterance) and may generate output audio data in response to the utterance.

A speech-controlled computing system may answer user commands requesting the output of content. For example, a user may say "Computer, what is the weather?" In response, the system may output weather information. For further example, a user may say "Computer, play music from the 90's." In response, the system may output music from the 1990's.

In various examples, in order to interpret a request, the NLU component (and/or other component) of a speech processing system may have access to contextual information. Contextual information or data may be factual information contextualized to a particular entity. An entity may be a particular device ID, a particular IP address, an account ID, a request ID, etc. Various different partition keys may be used to define an entity. For example, for the user request "Computer, what is the weather," the NLU component may have access to a device identifier (e.g., an identifier of a speech-processing device with one or more microphones receiving the spoken user request). In this example, the device identifier may be the partition key used to define the entity. The device identifier may be associated with a registered location of the device. For example, the device ID of the device receiving the spoken request "Computer, what is the weather?" may be registered to an address located in Seattle, Washington. Accordingly, the NLU component may receive the contextual data (e.g., that the device ID of the device receiving the spoken request is located in Seattle, Washington) along with text representing the spoken request. Accordingly, the contextual data may be used to form an inference that the user would like to know the weather in Seattle, Washington.

In various examples, query languages (e.g., GraphQL) used to retrieve contextual data may not support chaining multiple queries together in a single call to the contextual data service. In some examples, graph query language queries may be used to retrieve data from graph databases. A graph database may be a data structure that relates data items in the data structure to be linked to one another. For example, individual data entries in graph databases may be referred to as "nodes." The relationship between a node and a different node is represented by the graph database as an "edge." Accordingly, graph databases may represent the relationships between different data entries using the structure of the graph database. Semantic queries, such as the graph query language queries described herein, may be used to retrieve information from the graph database. Semantic queries enable the retrieval of both explicitly and implicitly derived information from a graph database based on syntactic, semantic and structure information that is represented by the graph database.

In some cases, dependencies exist where the input to one query is the output of some other query. In such cases, multiple calls to the contextual data service—each call corresponding to a query—may be needed in order to provide the requested contextual data. Making multiple calls to a contextual data service may impact latency, as the number of round trips to back-end contextual data providers increases with multiple calls/queries. Further, in some cases, queries and/or calls to contextual data providers are conditioned on some pre-existing condition being met (e.g., the condition is satisfied). For example, a first call to a contextual data service may be made to retrieve an account status associated with a device. A second call to retrieve context for playback may be made only if the value of account_status=valid. Currently, some query languages (e.g., GraphQL) do not include native support for such conditional queries. Instead, the client maintains logic defining the condition on the client side and checks the condition prior to sending additional queries to the contextual data service (e.g., when the condition is met). This increases the number of calls to the contextual data service potentially resulting in increased latency, network congestion, and/or contextual data provider availability. Further, in some cases, calls to contextual data providers (that may be owned and/or controlled by different organizations/entities) may be made even when the result of that query is no longer needed (e.g., due to a client-side condition not being met). Such calls are expensive and tie up computing resources.

Described herein is logic effective to provide dependent queries wherein multiple subqueries and their dependencies may be defined in a single call to a contextual data service, even when the query language does not natively support such dependent queries. As described herein, such dependent queries may reduce latency and/or be used to manage network traffic to different data providers. Additionally, conditional queries are described wherein a condition may be included in a query that may be evaluated by the contextual data service without having to return intermediate results and without requiring that the client implement client-side conditions and make subsequent calls to the contextual data service (e.g., when the condition is met). As used herein, the term "client" refers to any device, software, system, and/or combination thereof, that requests data from a contextual data service. Similarly, a "call" refers to an atomic request issued by a client. Calls may include queries, which may adhere to the particular query syntax of the relevant query language provided by the application programming interface (API) being used. Queries may include computer-executable instructions that may be effective to cause one or more actions to be performed (e.g., related to retrieval of contextual data) by the contextual data service to which the query was directed.

Storage and/or use of contextual data related to a particular person or device may be controlled by a user using privacy controls associated with a speech-controlled device and/or a companion application associated with a speech-controlled device. Accordingly, users may opt out of storage of contextual data and/or may select particular types of contextual data that may be stored while preventing aggregation and storage of other types of contextual data. Additionally, aggregation, storage, and use of contextual information, as described herein, may be subjected to privacy controls to ensure compliance with applicable privacy standards, such as the Health Insurance Portability and Accountability Act (HIPAA) and the General Data Protection Regulation (GDPR).

The system may be configured with multiple applications (e.g., thousands, tens of thousands, or more applications) that can be used to respond to user commands. Applications may sometimes be referred to herein as "skills". For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application or applications may be applicable to handle an incoming user command is a non-trivial determination. In some cases, contextual data may be used to determine the appropriate skill or skills to invoke based on a particular user utterance.

The invocation of a skill by a user's utterance may include a request that an action be taken. That request can be transmitted to a control system that will cause that action to be executed. For example, the user's utterance may be, "Computer, turn on the living room lights." In response, instructions may be sent to a "smart home" system to turn on the lights in the user's living room. Examples of skills include voice-enabled applications invoked by the Siri virtual personal assistant from Apple Inc. of Cupertino, California, voice-enabled actions invoked by the Google Assistant virtual personal assistant from Google LLC of Mountain View, California, or voice-enabled skills invoked by the Alexa virtual personal assistant from Amazon.com, Inc. of Seattle, Washington.

In various examples, statistical NLU may be used to reduce the cognitive burden on the user. In an NLU-based approach, user utterances are typically classified into one or more intents and/or to one or more supported skills (or into an unsupported skill) followed by further skill-dependent intent and slot analyses (e.g., intent classification and entity extraction). In various examples, statistical NLU may be used to determine a list of intents, domains, skills, etc., that the user may have intended to invoke. The list of intents, domains, skills, etc. may be selected based at least in part on contextual data provided to the NLU. In some examples, the list of intents and/or domains (and/or other NLU results) may be ranked using a ranker component. Intents may be passed to an appropriate skill to perform an action in response to the request. In the example above where the user asks "Computer, what is the weather?" The intent may be a get_weather intent. The get_weather intent may be passed to a weather skill configured to provide audio of the current day's weather forecast. In various examples, contextual data may be used by the NLU to determine the intent based upon input textual data and/or by the skill to determine the appropriate action to take in response to the intent. For example, the location registered in association with the device ID (e.g., Seattle, Washington) may be provided by the NLU such that the intent generated by the NLU is a get_weather intent for the location "Seattle". The location registered in association with the device ID is an example of first contextual data. Similarly, the weather skill may determine, based on a previous request issued by the device ID or by an IP address associated with the device ID, that the user typically desires the forecast for the subsequent calendar day, based on previous interactions (e.g., previous turns of dialog) with the same device ID. The knowledge that weather requests issuing from the device ID typically request the forecast for the subsequent calendar day may be an example of second contextual data used by the weather skill to provide the best possible output for the user.

In addition to various speech processing components using contextual data, various speech processing components may generate and/or consume contextual data. For example, a user may utter a spoken request that a particular song be added to a playlist. A music skill may add the song to the playlist. In various examples, an identifier for the song added to the playlist may represent contextual data for the device ID, account ID, IP address, and/or other entity.

FIG. 1 is a conceptual illustration of a system 100 including a context aggregator component 138 that is effective to process dependent queries, in accordance with various embodiments of the present disclosure. As shown in FIG. 1, the system 100 includes a computing device 110, a natural language processing system 120, a skill 170, and a context aggregator component 138. In various examples, computing device 110 may be configured in communication with the natural language processing system 120 over a network 104. Natural language processing system 120 may include one or more speech processing devices and/or components effective to process natural language inputs and generate some action as a result. Examples of such actions may include answering questions, controlling other computing devices and/or Internet-of-Things devices, controlling software (e.g., music playback software), etc. Network 104 may be, for example, a wide area network, such as the Internet. Natural language processing system 120 (which may include one or more different physical devices) may be capable of performing speech processing (e.g., ASR and NLU) as well as non-speech processing operations as described herein. A single computing device may perform all speech processing or multiple computing devices may combine to perform all speech processing.

Context aggregator component 138 may be a service through which natural language processing system 120, skill 170, and/or other devices and/or services may store and retrieve contextual data. Context aggregator component 138 may have a context service access layer 140 which may provide access to underlying context providers 142a, 142b, . . . , 142n. Each context provider 142a, 142b, . . . , 142n may represent one or more hosts (e.g., computing devices including storage for storing contextual data). Each of context providers 142a, 142b, . . . , 142n may be dedicated to a particular type of contextual data or may be used to store transient contextual data. Context providers 142a, 142b, . . . 142n may comprise computer-readable non-transitory storage comprising one or more databases for storing contextual data.

In various examples described herein, contextual data may be stored at a variety of network-accessible locations for retrieval by skills, applications, NLU components, ranker components, and/or other components of a natural language-processing architecture and/or other device and/or service. A context service access layer 140 (e.g., an application programming interface (API) of context aggregator component 138) may provide an access point to contextual data stored by a plurality of contextual data providers (e.g., context providers 142a, 142b, etc.). In various examples, the context service access layer 140 may include logic that modifies the native capabilities of a query language being employed by the context aggregator component 138. Specifically, the context service access layer 140 may include computer-executable instructions effective to enable dependent queries and/or conditional queries (e.g., dependent GraphQL queries and/or conditional GraphQL queries). Context aggregator component 138 may include a dependent query component 150 effective to execute multiple sub-queries included in a single query issued in a call 165 by client (e.g., skill 170, natural language processing system, etc.).

According to various embodiments described herein, the context service access layer 140 may provide a query language effective to receive calls (e.g., call 165) including queries for various contextual data stored by context aggregator component 138. Context aggregator component 138 may expose a query language (e.g., including a query language schema) to natural language processing system 120 and/or skill 170. Context service access layer 140 may provide functionality enabling dependent and/or conditional queries to be sent to the context aggregator component (e.g., from clients such as natural language processing system 120, skill 170, etc.).

In an example where a dependent query is sent to the context aggregator component 138, the call 165 may include a GraphQL query 152. The GraphQL query 152 may include a first sub-query. The first sub-query may take as input data output by a second sub-query that is also defined by the GraphQL query 152. Accordingly, the GraphQL query 152 may define a dependent variable, as described in further detail below, that instructs the second sub-query to first retrieve output data and then to pass the output data as an input to the first sub-query to return the result data.

For example, the dependent query component 150 may determine that the output of the second sub-query is to be passed as an input to the first sub-query. As such, dependent query component 150 may first perform an operation of the second sub-query (action 154). In the example of FIG. 1, the operation of the second sub-query may be to retrieve data from context provider 142a (action 156). The retrieved data may then be passed as an input to an operation of the first sub-query. The first sub-query (including the input data retrieved at action 156) may be sent to context provider 142b (action 158) and may be used to retrieve the result data (action 160). Upon determining the result data, which is the output of the first sub-query in the current example, the result data may be returned at action 162 as a response to the call. In other words, the result data may be returned to the client issuing the GraphQL query 152. As can be seen, in this example, only a single call is made to the context aggregator component 138. The dependency is evaluated by the context aggregator component 138 and the intermediate result data (e.g., the intermediate data retrieved at action 156) is "plumbed" to the sub-query that uses the intermediate result data as an input. "Plumbing" in this context refers to passing intermediate output data as an input to another operation that that takes the intermediate output data as an input, as defined by the query. The ultimate result of the GraphQL query 152 is returned in response to the call 165. Another example with additional detail is depicted in FIG. 2.

A "skill" as used herein may correspond to a natural language processing application. Skills may be software running on a natural language processing system 120 and akin to an application. That is, a skill may enable a natural language processing system 120 or other application computing device(s) to execute specific functionality in order to provide data or produce some other output called for by a user. The system may be configured with more than one skill. For example a weather service skill may enable the natural language processing system 120 to execute a command with respect to a weather service computing device(s), a car service skill may enable the natural language processing system to execute a command with respect to a taxi service computing device(s), an order pizza skill may enable the natural language processing system to execute a command with respect to a restaurant computing device(s), etc. A skill 170, the natural language processing system 120, and/or some other device may be consumers and/or providers of contextual data stored from the context aggregator component 138. Accordingly, such clients of the context aggregator component 138 may retrieve and/or store contextual data at one or more context providers 142a, 142b, etc., via context service access layer 140.

Figure 2:
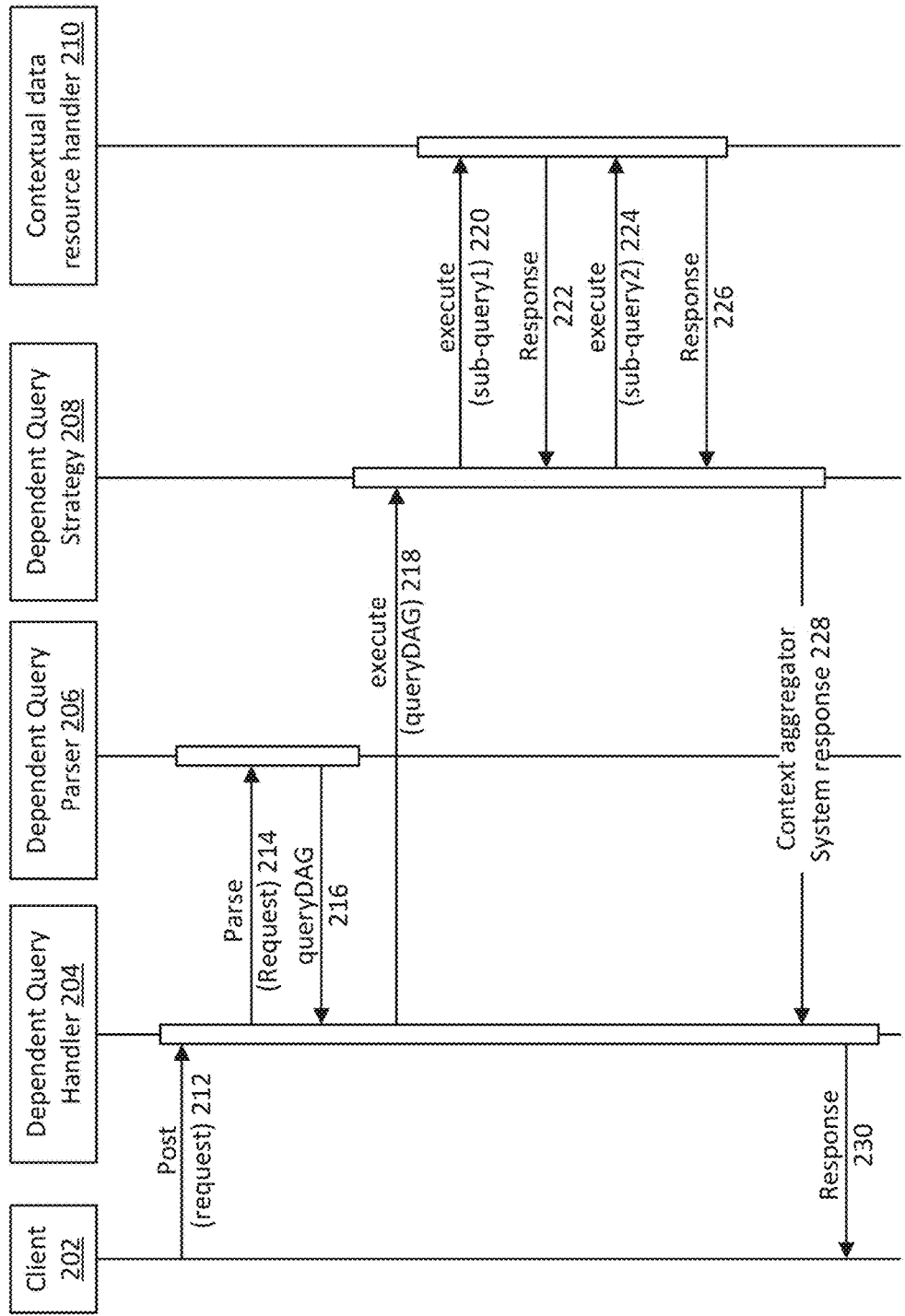
FIG. 2 is a flow diagram illustrating an example sequence for dependent queries directed to a context aggregator component, according to various embodiments of the present disclosure.

FIG. 2 is a flow diagram illustrating an example sequence for dependent queries directed to a context aggregator component, according to various embodiments of the present disclosure. In various examples, a client 202 of context aggregator component 138 (FIG. 1) may post a request 212 to a dependent query handler 204 of the context aggregator component 138. The request may be a query (e.g., a GraphQL query) that specifies a dependency, as described in further detail below. The dependent query handler 204 may generate a parse (request) 214 instruction and may send the instruction and the query to dependent query parser 206. Dependent query parser 206 may include logic effective to parse the query and determine any dependencies defined by the query. The dependent query parser 206 may return a queryDAG 216 to the dependent query handler 204. The queryDAG 216 includes a directed acyclic graph (DAG) such as the example DAG depicted in FIG. 5. The DAG may define the query and its constituent sub-queries as nodes, where each node corresponds to a computer-executable operation (e.g., a sub-query). The DAG may further include computer-executable instructions to execute each node as a separate thread and may define dependencies among the nodes and/or specify an order in which the nodes are to be executed.

The dependent query handler 204 may send the queryDAG 216 as an input to an operation execute(queryTree) 218 to be executed by the dependent query strategy component 208. The dependent query strategy component 208 may execute the queryDAG 216 according to the order of operations and/or dependencies specified by the queryDAG 216 (e.g., the DAG). In the example depicted in FIG. 2, sub-query1 is executed (e.g., using the command execute(sub-query1) 220) by contextual data resource handler 210 (e.g., one or more context providers) and the response 222 includes the output data output as a result of executing the sub-query1.

In the example of FIG. 2, the output of sub-query1 may be an input to sub-query2, as defined by the queryDAG 216. Accordingly, after retrieving the response 222 that includes the output of sub-query1, the dependent query strategy component 208 may send a command execute(sub-query2) 224 to contextual data resource handler 210. Although not shown, the output data of sub-query1 may be passed together with the execute(sub-query2) 224 command since the sub-query2 is dependent on the output of sub-query1. Contextual data resource handler 210 may execute sub-query2 using the output of sub-query1 and may return response 226 to dependent query strategy component 208. The response 226 may include output data output by sub-query2. The dependent query strategy component 208 may send the response 226 as the context aggregator system response 228 (e.g., the context aggregator component 138's response to the query request sent by client 202 (e.g., post (request) 212). The dependent query handler 204 may sent the response 230 back to the client 202 as the response to the client's query.

FIGS. 3A and 3B depict an example of source code that may be used to implement dependent queries, in accordance with various embodiments described herein. In various examples, dependent queries may use query language operations and variables to construct dependency between different operations of a query (e.g., a GraphQL query). Variables in GraphQL queries can be passed dynamically, manipulating the string at runtime. An operation name is an explicit name for an operation. For example, in FIG. 3A, there are three query operations with operation names A, B, and C. GraphQL documents support multiple operations with unique names. In various examples, the different and distinct query operations are referred to as "sub-queries" and the overall GraphQL document (e.g., the example document of FIGS. 3A, 3B) is referred to as a "query" that includes the "sub-queries" A, B, and C. In FIGS. 3A, 3B the example use case is to extract the data output by query B and query C and pass this data as an input to query A.

The arguments to the operation query A are the variables firstId and secondId that are defined as shown in FIG. 3B. Specifically, the variable definitions of firstId and secondId are JavaScript Object Notation (JSON) path expressions used to extract variable data out of different operations. Specifically, the variable definition of firstId in FIG. 3B is the JSON path expression $.B.testType.id. This JSON path expression references query B and passes the output of query B as the argument firstId to query A. Similarly, variable definition of secondId in FIG. 3B is the JSON path expression $.C.testType.id. This JSON path expression references query C and passes the output of query C as the argument secondId to query A. Accordingly, after dynamically passing the dependent variables firstId and secondId (which are defined as the outputs of sub-queries query B and query C, respectively) to the sub-query query A, the output of query A may be retrieved and passed as the output of the GraphQL query that is depicted in FIGS. 3A and 3B.

Figure 4:
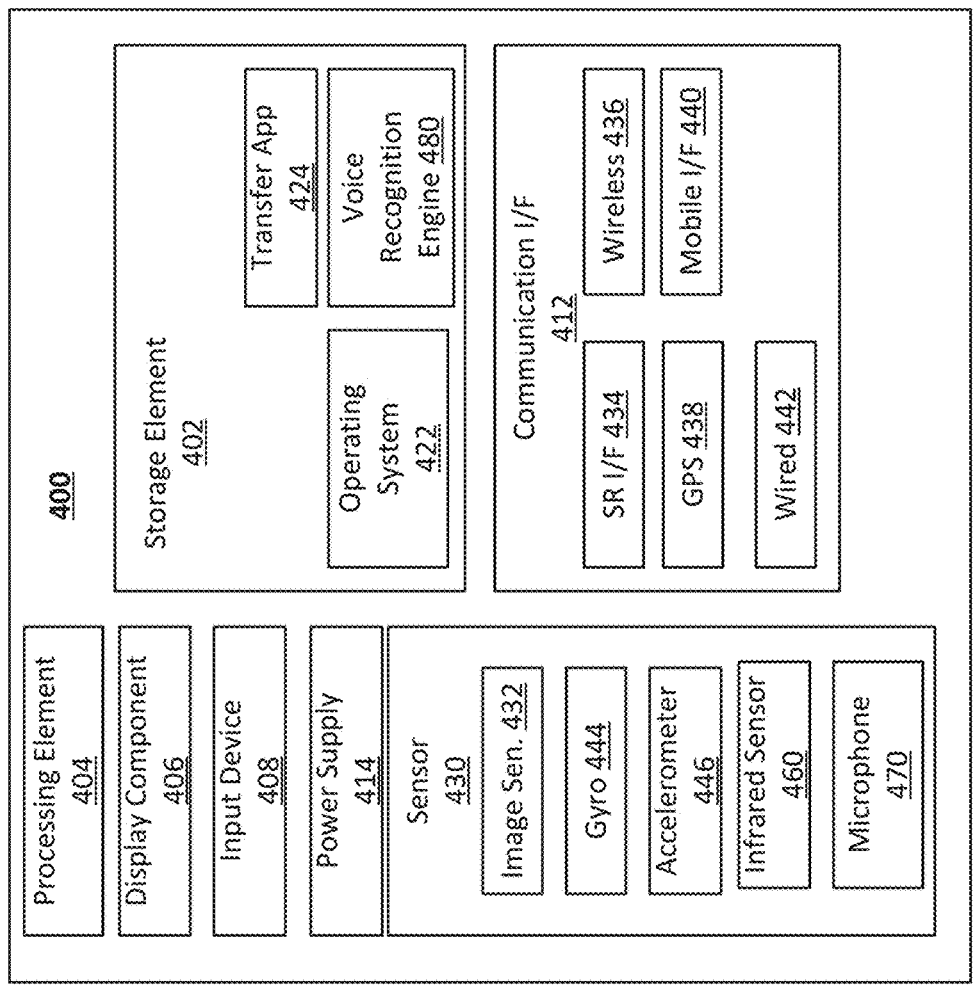
FIG. 4 is a conceptual diagram depicting a computing device that may be used in accordance with various aspects of the present disclosure.

FIG. 4 is a block diagram showing an example architecture 400 of a computing device, such as device 110, in accordance with various aspects of the present disclosure. It will be appreciated that not all devices will include all of the components of the architecture 400 and some user devices may include additional components not shown in the architecture 400. In some embodiments, computing systems may comprise one or more instances executing on one or more computing device hosts. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or non-transitory computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice commands to one or more voice recognition servers (e.g., natural language processing system 120). In some examples, storage element 402 may include logic effective to implement the dependent queries and/or conditional queries described herein.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice commands. Voice recognition engine 480 may interpret audio signals of sound captured by microphone 470. In some examples, voice recognition engine 480 may listen for a "wake-word" to be received by microphone 470. Upon receipt of the wake-word, voice recognition engine 480 may stream audio to a voice recognition server for analysis. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information.

Motion sensors may include any sensors that sense motion of the architecture including, for example, gyro sensors 444 and accelerometers 446. Motion sensors, in some examples, may be used to determine an orientation, such as a pitch angle and/or a roll angle, of a device. The gyro sensor 444 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 446 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 438 may be utilized as a motion sensor. For example, changes in the position of the architecture 400, as determined by the GPS interface 438, may indicate the motion of the GPS interface 438. Infrared sensor 460 may be effective to determine a distance between a surface and the device including the infrared sensor 460. In some examples, the infrared sensor 460 may determine the contours of the surface and may be capable of using computer vision techniques to recognize facial patterns or other markers within the field of view of the infrared sensor 460's camera. In some examples, the infrared sensor 460 may include an infrared projector and camera. Processing element 404 may build a depth map based on detection by the infrared camera of a pattern of structured light displayed on a surface by the infrared projector. In some other examples, the infrared sensor 460 may include a time of flight camera that may compute distance based on the speed of light by measuring the time of flight of a light signal between a camera of the infrared sensor 460 and a surface. Further, in some examples, processing element 404 may be effective to determine the location of various objects in the physical environment within the field of view of a device based on the depth map created by the infrared sensor 460. As noted above, in some examples, non-infrared depth sensors, such as passive stereo camera pairs, or non-identical camera pairs, may be used in device in place of, or in addition to, infrared sensor 460. Processing element 404 may be effective to determine the location of various objects in the physical environment within the field of view of a camera of architecture 400 based on the depth map created by one or more non-infrared depth sensors.

Figure 5:
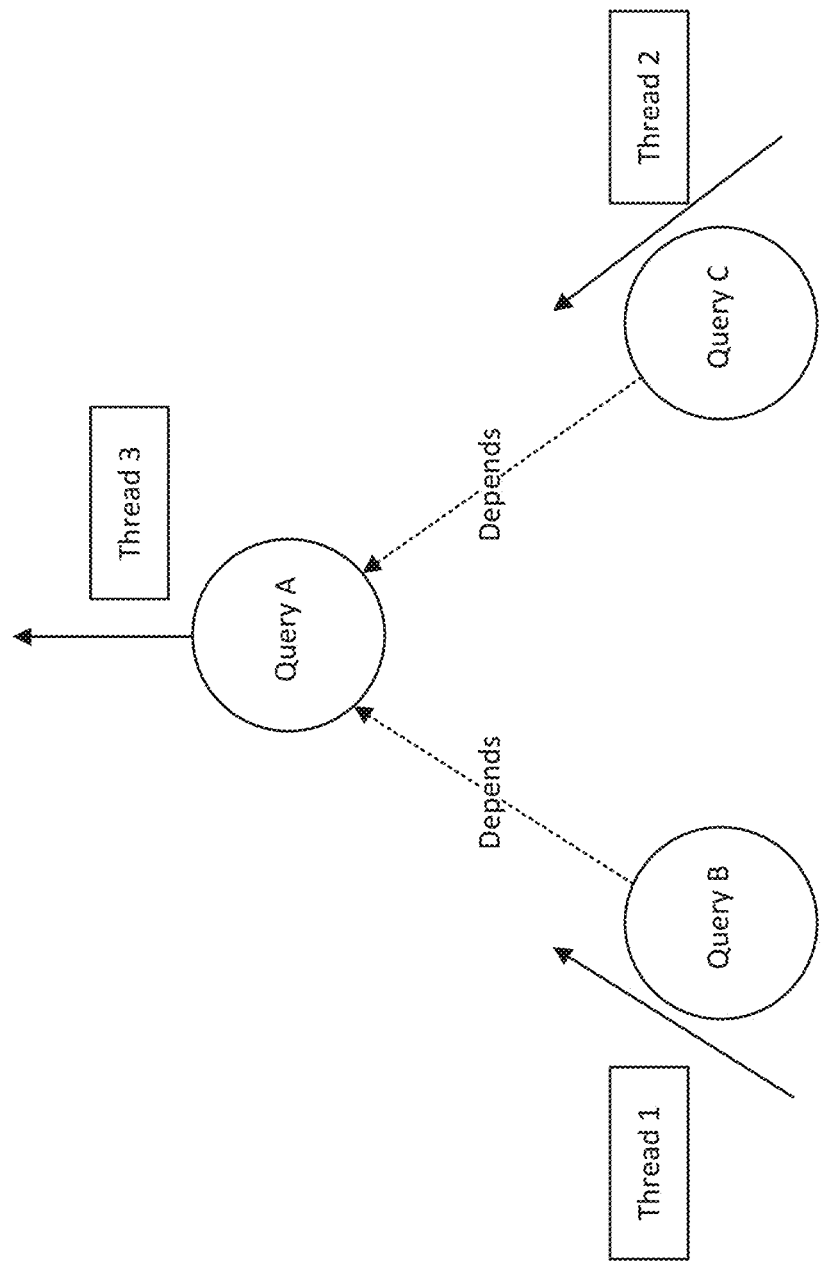
FIG. 5 depicts an example of a directed acyclic graph that may be used to execute dependent queries, in accordance with various aspects of the present disclosure.

FIG. 5 depicts an example of a directed acyclic graph that may be used to execute dependent queries, in accordance with various aspects of the present disclosure. FIG. 5 depicts an example of a DAG that may be generated for the example query source code of FIGS. 3A, 3B. The DAG may define the query and its constituent sub-queries (e.g., queries A, B, and C) as nodes, where each node corresponds to a computer-executable operation. In the example of FIG. 5, query A (a sub-query) depends on the output of queries B and C. The DAG may further include computer-executable instructions to execute each node as a separate thread and may define dependencies among the nodes and/or specify an order in which the nodes are to be executed.

Dependent query component 150 (FIG. 1) may be a logic layer deployed as part of context service access layer 140. Dependent query component 150 may construct the DAG from the code in query (e.g., the source code of FIGS. 3A, 3B). The query is parsed to construct the DAG where each Query Node is a single GraphQL Operation. A Node has completed execution when the query corresponding to it has completed execution and the variables (needed by the parent Node) are assigned values from the response. The Execution Strategy works by resolving the Graph bottom up by executing each Query Node and filling up the data in a Dependent Variable map, which is later consumed by the parent Operation in the graph. This recursion ends by resolving the root Operation which returns the response.

As previously described, each query (e.g., each sub-query) in the DAG may be executed in a different thread. Sibling queries (e.g., Query B and Query C in FIG. 5) may be executed in parallel. The parent query (e.g., Query A in FIG. 5) may only be executed when all children queries (e.g., sibling queries B and C) have completed execution.

Figure 6A:
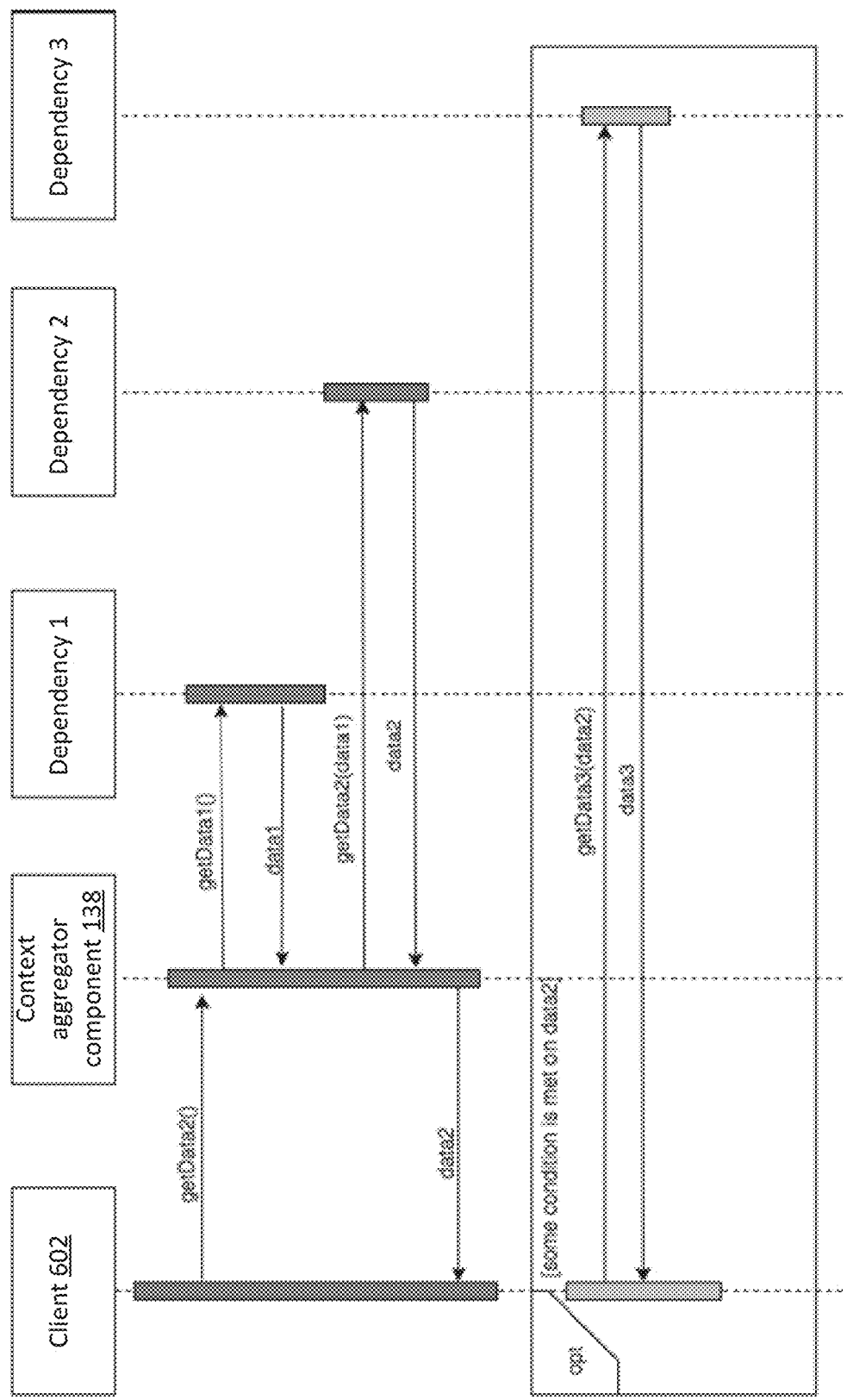
FIG. 6A depicts an example of a condition being checked following receipt of a query response, in accordance with various aspects of the present disclosure.

FIG. 6A depicts an example of a condition being checked following receipt of a query response, in accordance with various aspects of the present disclosure. In the example of FIG. 6A, a dependent query is executed resulting in the retrieval of "data2." As shown in FIG. 6A, the sub-query used to retrieve data2 uses data1 as an input. Data1 is the output of a getData1( ) sub-query. Accordingly, data1 is first retrieved and then is passed as an input to retrieve data2. In the example of FIG. 6A, data2 is returned to client 602 by context aggregator component 138. In this example, the client imposes some condition on data2. In the example shown, if the condition is met, the client 602 sends a separate query (getData3) to retrieve data3. The separate, conditional query getData3 takes data2 as an input. In the example depicted in FIG. 6A, data3 is returned to the client 602. Note, however, that the client 602 has issued two separate queries (e.g., getData2( ) and getData3(data2) in order to retrieve data3. Additionally, note that in the example of FIG. 6A, the client 602 implements the condition on the client side.

Figure 6B:
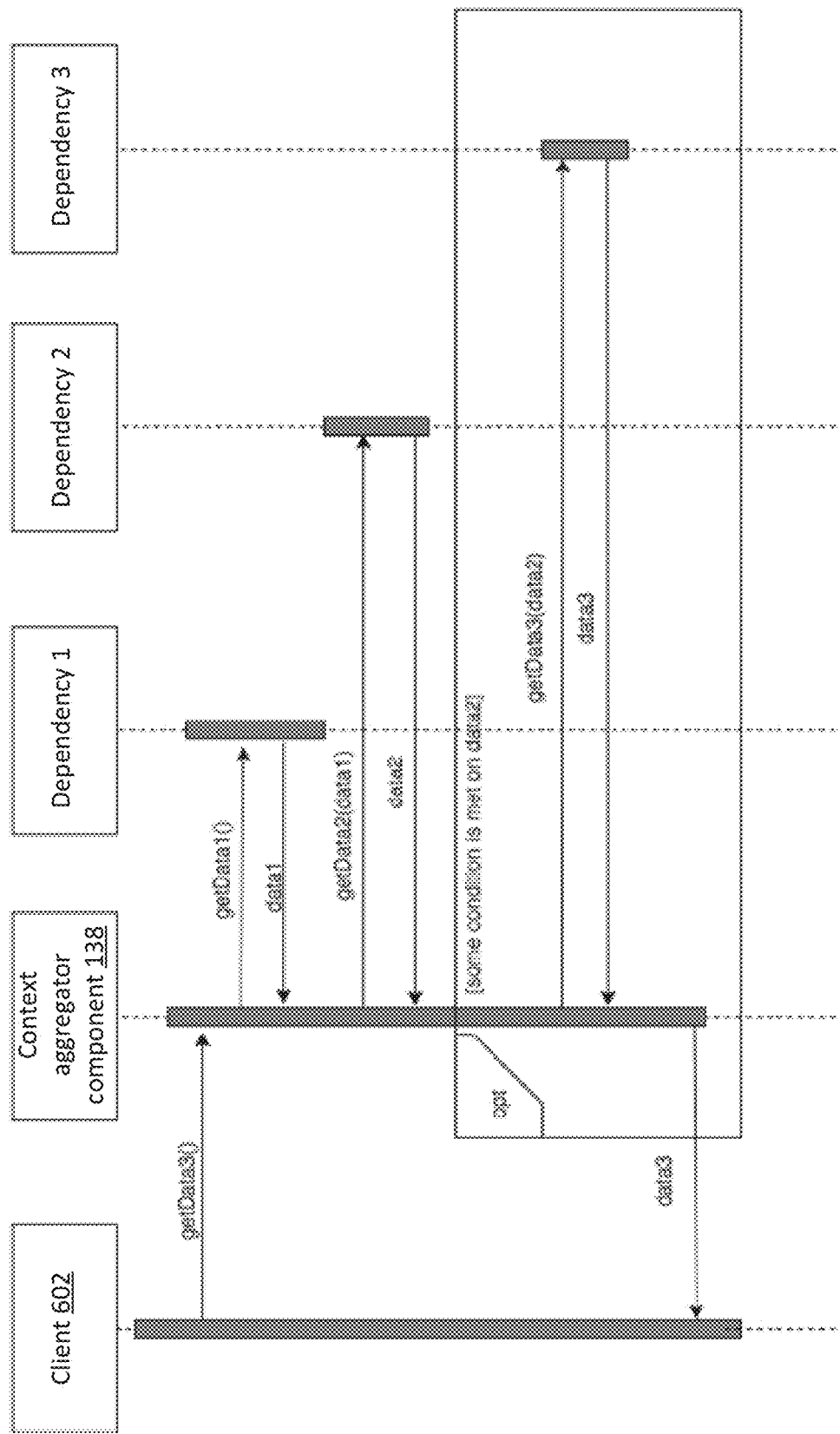
FIG. 6B depicts an example of a compound conditional query that may be effective to cause a condition to be checked prior to returning a query response, in accordance with various aspects of the present disclosure.

FIG. 6B depicts an example of a compound conditional query that may be effective to cause a condition to be checked prior to returning a query response, in accordance with various aspects of the present disclosure. In FIG. 6B, the client 602 issues a single query getData3( ) to the context aggregator component 138. In the example, the getData3( ) query may include both specified dependencies and a specified condition. The dependencies may be defined as described above. For example, the dependencies may specify that data1 (an output of sub-query getData1( ) is an input to the sub-query getData2( ) Additionally, the condition may be specified as described in further detail below. In the example of FIG. 6B, a condition is specified by client 602 in the query getData3( ) The context aggregator component 138 evaluates whether data2 meets the condition defined in the getData3( ) query without passing back the intermediate result data (e.g., data2). If the condition is met, another dependent sub-query (e.g., getData3(data2)) is executed to retrieve data3. Context aggregator component 138 returns data3 to the client 602. However, if the condition is not met, context aggregator component 138 may not perform the getData3( ) query, thereby reducing the amount of queries sent to the relevant context provider (e.g., context provider 142*a* of FIG. 1). Additionally, note that in contrast to the example shown in FIG. 6A, in FIG. 6B only a single query (e.g., a graphQL query) is sent by the client 602. Accordingly, in FIG. 6B the client may specify dependencies and conditions in a single call to the context aggregator component 138. By contrast, in FIG. 6A two calls are made by client 602 to context aggregator component 138. A first call is made that returns data2 (e.g., intermediate output data). The client 602 then checks a condition using data2. Then, a second call is made to retrieve data3 using data2 as an input.

FIGS. 7A and 7B depicts an example of source code that may be used to implement conditional compound queries, in accordance with various embodiments described herein. As previously described, adding support for conditional queries in a query language that does not natively support such conditional queries allows clients to specify a condition to be met for fetching contextual data (e.g., from context aggregator component 138) via the query itself in a single network call.

In various examples, GraphQL employs four data types: strings, integers, Booleans, and lists. Described herein is a new component that takes a FreeMarker template as input and processes it. The condition to be evaluated is passed within the FreeMarker template and the response to the condition is optionally transformed into a string, Boolean, or integer (depending on the implementation). To support this transformation as a result of FreeMarker template processing, three new GraphQL fields are introduced: evaluateToBoolean, evaluateToString, and evaluate ToInteger. These fields convert the FreeMarker template's string response into the pertinent data type (e.g., Boolean, string, or integer, respectively).

The input arguments to the three new GraphQL fields may be:

1. A condition argument implemented as a FreeMarker template passed as a String
2. A number (e.g., three) of optional integer arguments
3. A number (e.g., three) of optional string arguments
4. A number (e.g., three) of optional boolean arguments An example schema for the new GraphQL fields is depicted in FIG. 7A. The response from the resolvers (e.g., evaluateToBoolean, evaluateToString, and evaluateToInteger) can be fed into a dependent query in accordance with the various techniques described above. An example is depicted in FIG. 7B.

In FIG. 7B countryofResidence is retrieved from a first context provider using a first sub-query (CORQuery) and customerAge is retrieved from a second context provider using a second sub-query (CustomerAgeQuery). Next the FreeMarker template condition "if countryOfResidence!=null && customerAge>18" (EvaluateQuery) is evaluated. If the condition is true, the television cable provider may be retrieved for the user (using the TvCableQuery). By contrast, if the condition is false, nothing further is retrieved and the query is terminated. As seen in FIG. 7B, the sub-query EvaluateQuery( ) is dependent on the CORQuery( ) sub-query and the CustomerAgeQuery( ) sub-query. The Boolean data (e.g., a Boolean value) resulting from the evaluateToBoolean( ) field is fed into the dependent sub-query TvCableQuery( ).

Figure 8:
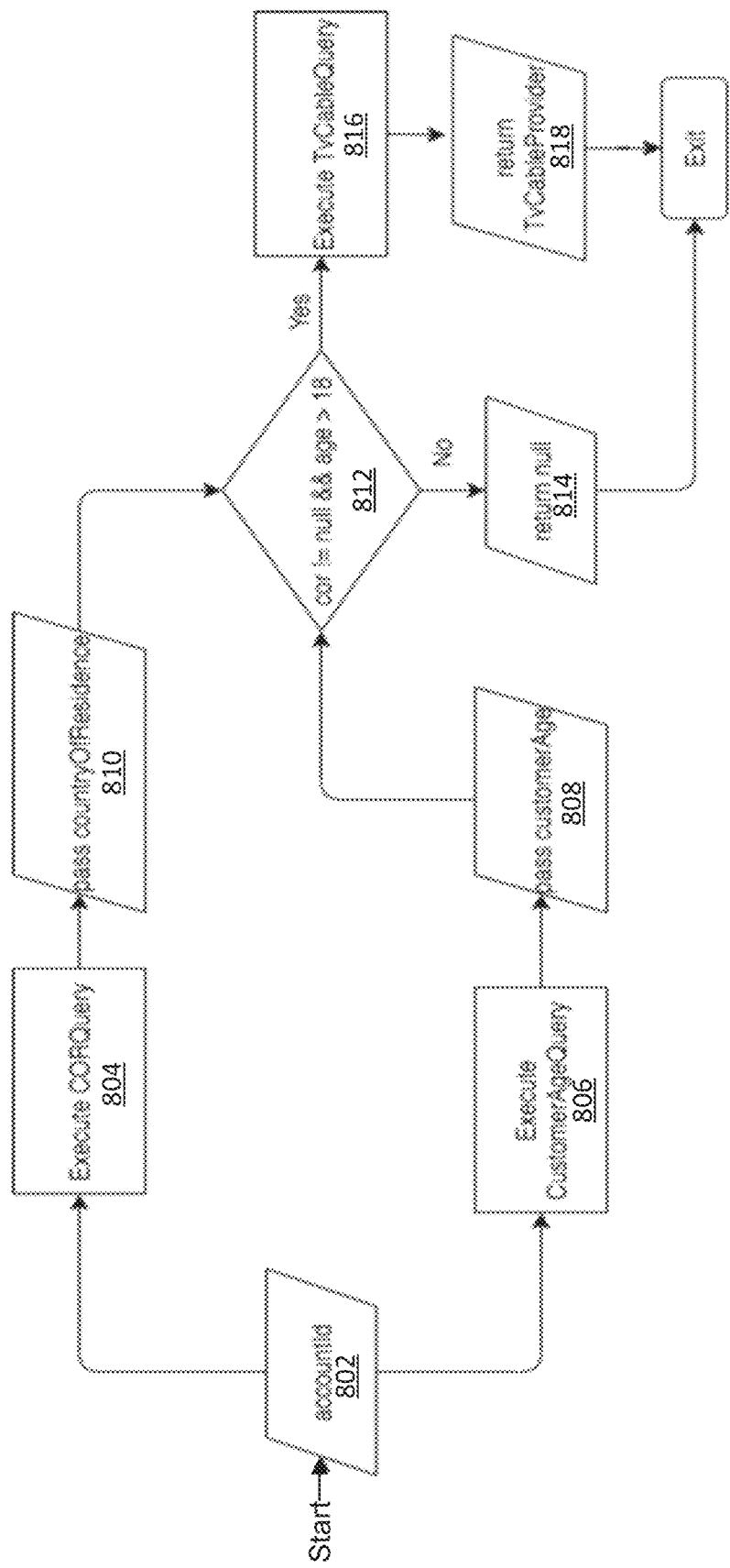
FIG. 8 depicts an example flow chart illustrating the example of FIGS. 7A and 7B, in accordance with various embodiments described herein.

FIG. 8 depicts an example flow chart illustrating the example of FIGS. 7A and 7B, in accordance with various embodiments described herein. At action 802 the accountId may be retrieved. The accountId is defined as a variable in the code depicted in FIG. 7B. Processing may proceed to actions 804 and 806. In various examples, the sibling operations of actions 804 and 806 may be performed in parallel. The output of action 804 may be the countryOfResidence 810 output by the sub-query CORQuery, while the output of action 806 may be the customerAge 808 output by sub-query CustomerAgeQuery. The countryofResidence and customerAge may be inputs to the condition defined for the EvaluateQuery sub-query. The EvaluateQuery sub-query incorporates the evaluateToBoolean GraphQL field. At action 812, the evaluateToBoolean condition is defined as <#if stringArg1?? && intArg1 gt 18>True<#else>False</if>". stringArg1 is defined as the output of the CORQuery and intArg1 is defined as the output of the CustomerAgeQuery. If the CORQuery result is not null and the CustomerAgeQuery result is greater than 18, processing proceeds to action 816, at which the sub-query TvCableQuery is executed. The TvCableQuery returns the tvCableProvider at action 818 if the Boolean output by action 812 is true (and if the accountId has a valid value) and the query processing is terminated. Conversely, if the Boolean output by action 812 is false, null value is returned at action 814 and the query processing is terminated.

Figure 9:
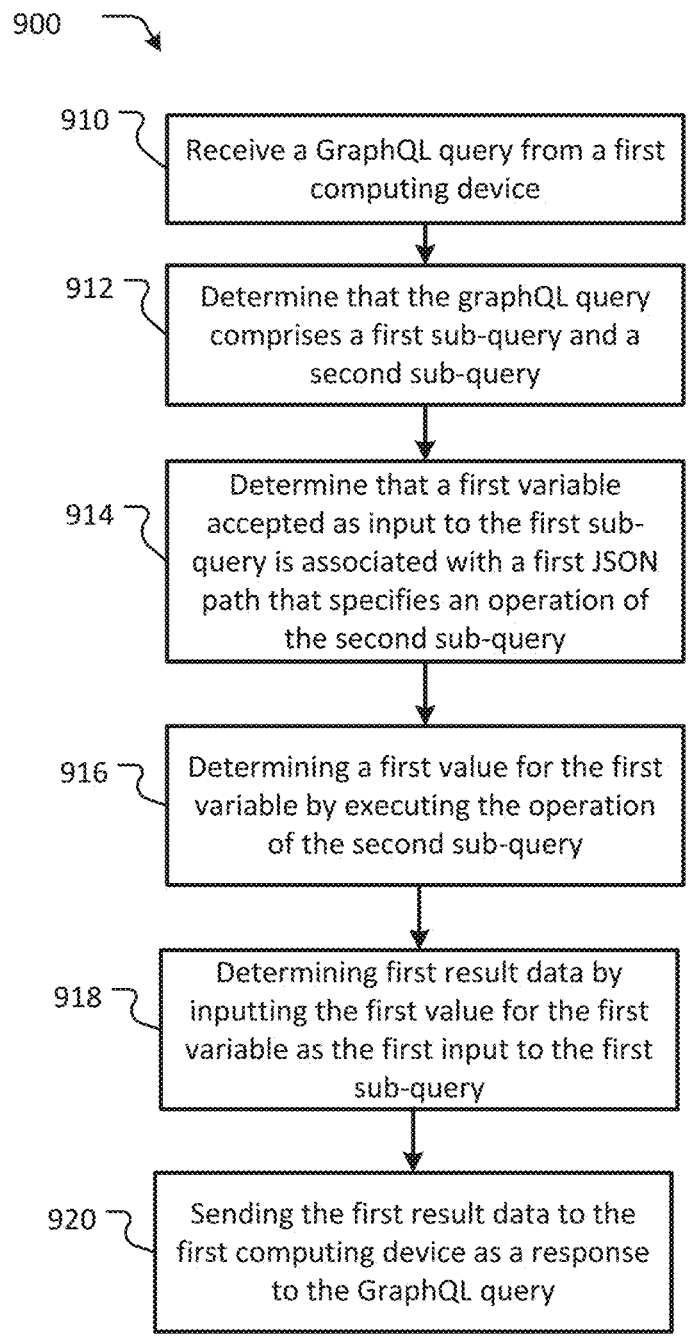
FIG. 9 depicts a flow chart showing an example process for executing a dependent query in a query language, in accordance with various aspects of the present disclosure.

FIG. 9 depicts a flow chart showing an example process 900 for executing a GraphQL dependent query, in accordance with various aspects of the present disclosure. The actions of the process 900 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 900 may begin at action 910, at which a GraphQL query may be received from a first computing device. For example, skill 170, natural language processing system 120, and/or some other computing device and/or application may make an API call to context aggregator component 138 via context service access layer 140. The API call may include a GraphQL query to retrieve context data stored by one or more context providers 142a, 142b, etc., of the context aggregator component 138.

Process 900 may continue at action 912, at which a determination may be made that the GraphQL query includes at least a first sub-query and a second sub-query. In various examples, the sub-queries may be the constituent queries of the GraphQL query that are included in the same network call. For example, the GraphQL query illustrated in FIGS. 3A, 3B includes three sub-queries A, B, and C.

Process 900 may continue at action 914, at which a determination may be made that a first variable that is accepted as input to the first sub-query is associated with a first JSON path that specifies an operation of the second sub-query. For example, query A of FIG. 3A (a first sub-query) takes firstId as input. "firstId" is defined (in FIG. 3B) by reference to the JSON path $.B.testType.id which is an operation (and an output) of query B (a second sub-query).

Processing may continue at action 916, at which a first value may be determined for the first variable by executing the operation of the second sub-query. For example, in FIGS. 3A, 3B the operation testType( ) of query B may be executed to determine the first value "id". The dependent variable section of FIG. 3B defines the result of this operation as the "firstId" which is among the inputs to query A (e.g., the first sub-query).

Processing may continue at action 918, at which first result data may be determined by inputting the first value for the first variable as the first input to the first sub-query. For example, the result of query B (along with the result from query C) may be passed as an input to query A of FIGS. 3A, 3B to obtain the result data (e.g., the alias1 id and the alias2 id).

Processing may continue at action 920, at which the first result data may be sent to the first computing device as a response to the GraphQL query. At action 920, the dependent query handler 204 may return the result data generated at action 918. Notably, only a single network call was made using a dependent GraphQL query. Dependent sub-queries were defined and argument plumbing was used to fetch and provide the intermediate data to obtain the ultimate result data.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
receiving, by a contextual data aggregator component associated with a natural language processing system, a graph query language query from a first natural language processing component executed by at least a first computing device;
determining that the graph query language query comprises a first sub-query directed to a first graph database hosted by a first context provider and a second sub-query directed to a second graph database hosted by a second context provider;
determining that a first variable accepted as a first input to the first sub-query is associated with first path data that specifies an operation of the second sub-query;
determining a first value for the first variable by executing the operation of the second sub-query;
determining first result data by inputting the first value for the first variable as the first input to the first sub-query; and
sending the first result data to the first computing device as a response to the graph query language query, wherein the first natural language processing component is effective to take a first action using the first result data.

2. The computer-implemented method of claim 1, further comprising:
determining that a second variable accepted as a second input to the first sub-query is associated with a JavaScript Object Notation (JSON) path that specifies an operation of a third sub-query of the graph query language query;
generating a directed acyclic graph (DAG) comprising a first node associated with the first sub-query, a second node associated with the second sub-query, and a third node associated with the third sub-query;
determining, using the DAG, that the second node and the third node are to be executed in parallel prior to execution of the first node; and
executing the second node and the third node in parallel prior to execution of the first node.

3. The computer-implemented method of claim 1, further comprising:
determining that the graph query language query comprises a condition that returns a first Boolean value if the first value for the first variable meets the condition and a second Boolean value if the first value for the first variable does not meet the condition;
determining that the first value for the first variable meets the condition; and
sending the first Boolean value as an input to the first sub-query, wherein the determining the first result data by inputting the first value for the first variable as the first input to the first sub-query is performed in response to the first value for the first variable meeting the condition.

4. A method comprising:
receiving, by a context aggregator component from a first natural language processing component executed by at least a first computing device, a first query in a first graph query language, the first query comprising a first sub-query directed to a first database hosted by a first context provider and a second sub-query directed to a second database hosted by a second context provider;
determining, by the context aggregator component, that a first input to the first sub-query corresponds to first output data from the second sub-query;
determining the first output data from the second sub-query;
providing the first output data from the second sub-query as the first input to the first sub-query to generate first result data; and
sending the first result data to the first natural language processing component, wherein the first natural language processing component is effective to take a first action using the first result data.

5. The method of claim 4, further comprising:
determining that the first input to the first sub-query is defined as a first variable by a variable definition portion of the first query;
determining that the first variable is associated with a JavaScript Object Notation (JSON) path in the variable definition portion of the first query; and
determining that the JSON path corresponds to the second sub-query.

6. The method of claim 4, further comprising:
determining that a first operation of the first sub-query uses a second input; and
determining that the second input is defined as a first variable associated with the first output data from a second operation of the second sub-query.

7. The method of claim 4, further comprising:
determining, by the context aggregator component, that a second input to the first sub-query comprises second output data from a third sub-query of the first query directed to the first database;
determining the second output data from the third sub-query; and
generating the first result data based at least in part on the second output data.

8. The method of claim 7, further comprising generating a directed acyclic graph (DAG) that defines that the second sub-query and the third sub-query are executed in parallel prior to execution of the first sub-query.

9. The method of claim 4, further comprising:
determining a third sub-query of the first query that comprises a condition that evaluates the first output data;
sending the first output data from the second sub-query as an input to the third sub-query; and
sending the first output data as the first input to the first sub-query based at least in part on the condition.

10. The method of claim 4, further comprising:
determining that the first output data satisfies a condition included in the first query;
generating Boolean data indicating that the first output data satisfies the condition; and
sending the Boolean data as a second input to the first sub-query, wherein the first result data is further generated based at least in part on the Boolean data.

11. The method of claim 4, further comprising:
receiving, by the context aggregator component from the first natural language processing component, a second query directed to the first database, the second query comprising a third sub-query and a fourth sub-query;
determining, by the context aggregator component, that an input to the third sub-query comprises output data from the fourth sub-query;
determining the output data from the fourth sub-query;
evaluating the output data using a condition included in the second query; and
determining that the second query is to be terminated based at least in part on the output data and the condition.

12. The method of claim 4, further comprising:
generating first instructions that, when executed by the context aggregator component, are effective to cause the second sub-query to be executed as a first thread; and
generating second instructions that, when executed by the context aggregator component, are effective to cause the first sub-query to be executed as a second thread, the first sub-query using the first output data from the first sub-query.

13. A system comprising:
at least one processor; and
non-transitory computer-readable memory storing instructions that, when executed by the at least one processor are effective to:
receive, from a first natural language processing component executed by at least a first computing device, a first query in a first graph query language, the first query comprising a first sub-query directed to a first database hosted by a first context provider and a second sub-query directed to a second database hosted by a second context provider;
determine that a first input to the first sub-query corresponds to first output data from the second sub-query;
determine the first output data from the second sub-query;
provide the first output data from the second sub-query as the first input to the first sub-query to generate first result data; and
send the first result data to the first natural language processing component, wherein the first natural language processing component is effective to take a first action using the first result data.

14. The system of claim 13, the non-transitory computer-readable memory storing further instructions that, when executed by the at least one processor, are further effective to:
determine that the first input to the first sub-query is defined as a first variable by a variable definition portion of the first query;
determine that the first variable is associated with a JavaScript Object Notation (JSON) path in the variable definition portion of the first query; and
determine that the JSON path corresponds to the second sub-query.

15. The system of claim 13, the non-transitory computer-readable memory storing further instructions that, when executed by the at least one processor, are further effective to:
determine that a first operation of the first sub-query uses a second input; and
determine that the second input is defined as a first variable associated with the first output data from a second operation of the second sub-query.

16. The system of claim 13, the non-transitory computer-readable memory storing further instructions that, when executed by the at least one processor, are further effective to:
determine that a second input to the first sub-query comprises second output data from a third sub-query of the first query directed to the first database;
determine the second output data from the third sub-query; and
generate the first result data based at least in part on the second output data.

17. The system of claim 16, the non-transitory computer-readable memory storing further instructions that, when executed by the at least one processor, are further effective to:
generate a directed acyclic graph (DAG) that defines that the second sub-query and the third sub-query are executed in parallel prior to execution of the first sub-query.

18. The system of claim 13, the non-transitory computer-readable memory storing further instructions that, when executed by the at least one processor, are further effective to:
determine a third sub-query of the first query that comprises a condition that evaluates the first output data;
send the first output data from the second sub-query as an input to the third sub-query; and
send the first output data as the first input to the first sub-query based at least in part on the condition.

19. The system of claim 13, the non-transitory computer-readable memory storing further instructions that, when executed by the at least one processor, are further effective to:

determine that the first output data satisfies a condition included in the first query;
generate Boolean data indicating that the first output data satisfies the condition; and
send the Boolean data as a second input to the first sub-query, wherein the first result data is further generated based at least in part on the Boolean data.

20. The system of claim 13, the non-transitory computer-readable memory storing further instructions that, when executed by the at least one processor, are further effective to:
receive, from the first natural language processing component, a second query directed to the first database, the second query comprising a third sub-query and a fourth sub-query;
determine that an input to the third sub-query comprises output data from the fourth sub-query;
determine the output data from the fourth sub-query;
evaluate the output data using a condition included in the second query; and
determine that the second query is to be terminated based at least in part on the output data and the condition.

* * * * *